United States Patent [19]
Mosley

[11] Patent Number: 6,138,608
[45] Date of Patent: Oct. 31, 2000

[54] FEEDER WITH TRAINING APPARATUS

[75] Inventor: James H. Mosley, Mobile, Ala.

[73] Assignee: Flipper Feeder, Inc., Mobile, Ala.

[21] Appl. No.: 09/303,490

[22] Filed: Apr. 30, 1999

Related U.S. Application Data

[60] Provisional application No. 60/085,342, May 13, 1998.

[51] Int. Cl.[7] .................................. A01K 1/10; A01K 7/00
[52] U.S. Cl. .................................. 119/62; 119/72
[58] Field of Search .................................. 119/61, 62, 63, 119/72, 73; 220/827, 831, 832, 844, 848, 836, 841, 290, 810, 300, 351, 350

[56] References Cited

U.S. PATENT DOCUMENTS

| | | | |
|---|---|---|---|
| 572,217 | 12/1896 | Rebmann | 220/836 |
| 685,747 | 11/1901 | Darrah | 220/810 |
| 948,491 | 2/1910 | Andreas et al. | 220/831 |
| 1,503,190 | 7/1924 | Kim | 220/832 |
| 1,599,352 | 9/1926 | Ahlman | 119/61 |
| 1,915,407 | 6/1933 | Crary | 220/290 |
| 4,005,800 | 2/1977 | Schurman | 220/337 |
| 4,505,228 | 3/1985 | Scott | 119/62 |
| 4,723,686 | 2/1988 | Pennisi | 220/300 |
| 4,771,735 | 9/1988 | Larsen | 119/62 |
| 5,441,167 | 8/1995 | Shigeru | 220/334 |
| 5,546,894 | 8/1996 | St-Pierre | 119/61 |
| 5,653,001 | 8/1997 | Lane | 16/340 |

FOREIGN PATENT DOCUMENTS

| 759791 | 10/1956 | United Kingdom | 119/62 |
|---|---|---|---|

*Primary Examiner*—Michael J. Carone
*Assistant Examiner*—Son T. Nguyen

[57] ABSTRACT

The invention is a covered pet bowl for use by an animal with a nose having a bowl with a perimeter, a lid with a lip attached and a hinge attached to the bowl and the lid so that the animal may, with the animal's nose against the lip, releasably lift the lid. The hinge can hold the bowl lid open at a plurality of selected heights above the perimeter so that the lid is not in contact with the bowl perimeter. The hinge allows the lid to be opened further by pressure under the lid from one of the plurality of selected heights to a larger opening. Upon the animal releasing the lip, the lid returns to one of the plurality of selected heights. The hinge includes an opening regulation means for maintaining the arc from the bowl to the lid lip to less than 60 degrees to allow gravity to re-close the lid to the at least one user selected opening after the lid is released from the larger opening.

6 Claims, 10 Drawing Sheets

FEEDER WITH TRAINING APPARATUS

PRIORITY STATEMENT

This patent is a continuation in part of provisional application Ser. No. 60/085,342 filed May 13, 1998.

KNOWN PRIOR ART

Dog, cat and other animal feeders of various types are known. Some of these have covers. The primary improvement in this product over existing dog feeders lies in the training mechanism incorporated herein.

THE INVENTION

This application is for a feeder incorporating a means for training the animal in its use. Animals are easily trained. As a result, putting food outside typically results in insects and other animals moving close by to eat. A variety of techniques have been used to prevent insects, such as using a moat. Also, covers have been used on feeder bowls. The problem with prior dog bowls incorporating covers, lies in the fact that the animal must be trained in their use.

The present invention seeks to address the problems with the prior art by incorporating a relatively simple, but effective training mechanism which can be used to train an animal in the use of the dog bowl so that the animal for whom the food is intended can eat from it and other animals and pests are inhibited.

Other features of the lid are a stop means to keep the lid from opening ver 89 degrees, and preferably 59 degrees or less so the lid automatically closes when the animal removes its snout.

In order to train the dog to lift the cover himself a band or other mechanism holds the bowl open at various levels so that at first the holder is mostly open so as to re-close. As days go by, gradually, the cover is lowered until the dog is pushing it up from a sealed position.

A mechanism is provided to lift the cover when the user's hands are full. A reservoir is also envisioned.

It is therefore an object of this invention to provide a covered bowl for keeping out water, bugs and pests and for keeping food fresh.

It is a further object of this invention to provide a covered bowl with a means for training the animal in the use of the cover.

It is a further object to provide a bowl allowing for continuous feeding from a reservoir while keeping all of the food or drink held in the bowl fresh.

It is a further object to provide a bowl for feeding an animal which allows the user to easily open the bowl even with their hands full.

These and other objects and advantages of the invention will become better understood hereinafter from a consideration of the specification with reference to the accompanying drawings forming part thereof, and in which like numerals correspond to parts throughout the several views of the invention.

BRIEF DESCRIPTION OF THE DRAWINGS

For a further understanding of the nature and objects of the present invention, reference should be made to the following detailed description taken in conjunction with the accompanying drawings in which like parts are given like reference numerals and wherein.

DETAILED DESCRIPTION OF THE PREFERRED EMBODIMENT

Figure 1:
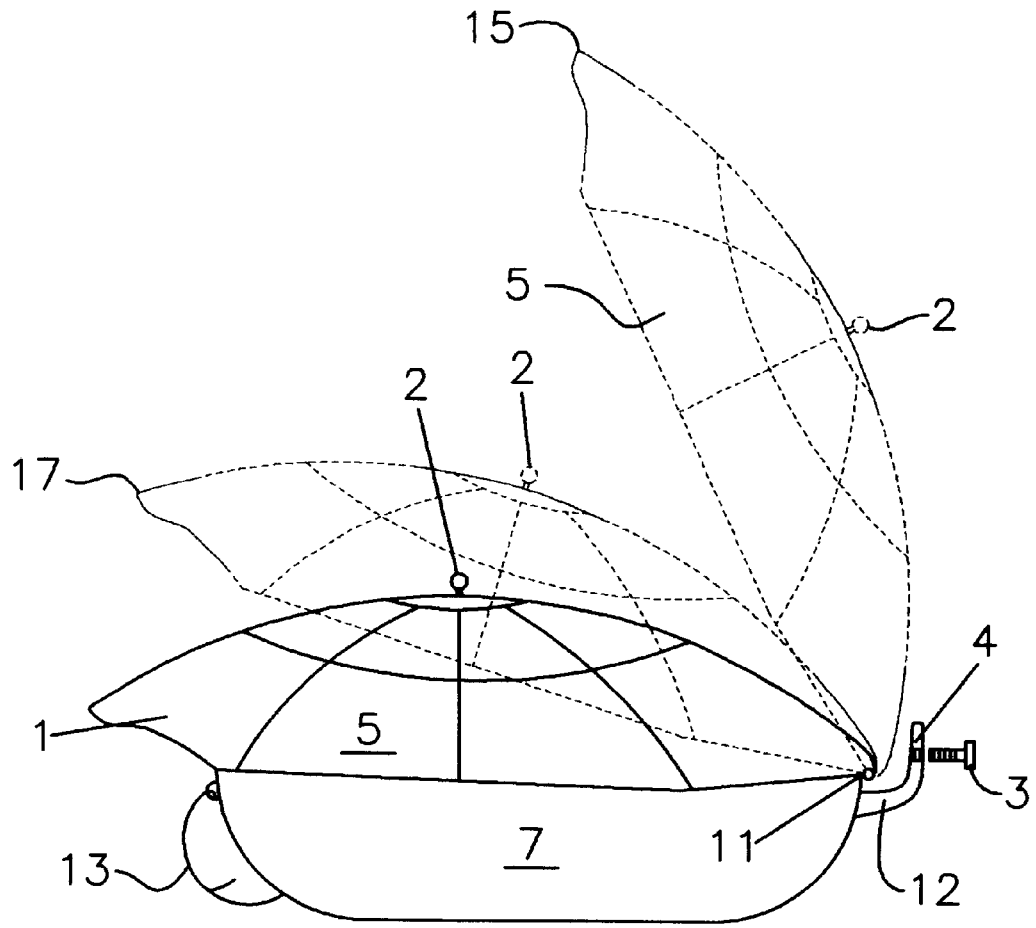
FIG. 1 is the side perspective view of the Flipper Feeder in three open positions.

As can best be seen by reference to FIGS. 1–6, the bowl 7, has a closable lid 5. The lid 5 has levels which may be adjusted by either using a screw or pin pushing against the lid to raise the lid as shown in FIG. 20–26. Alternatively, the lid may be controlled by a strap, as shown in alternate embodiments in FIGS. 1–6 and FIGS. 7–11. Where a strap is used, there are preferably at least three raised levels, first level 15, second level 16 and third level 17.

The preferred embodiment can best be seen by reference to FIGS. 20–26. The bowl may be designed defining at least one angled receiving opening 36. The most narrow end 37 of the angled receiving opening is at the top 35 of the bowl 7 and it widens towards the bottom 38 and inside 39 of the bowl, presenting an angled edge 40.

Figure 22:
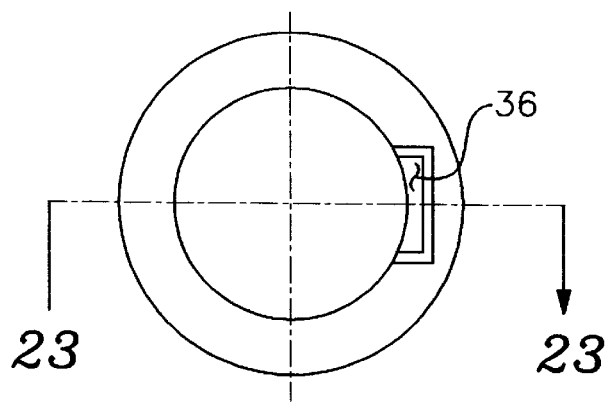
FIG. 22 shows a top view of the bowl of FIG. 20.
Figure 23:
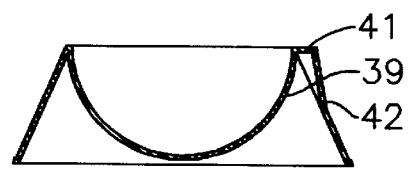
FIG. 23 shows a cross sectional view through the x—x axis of FIG. 22.
Figure 24:
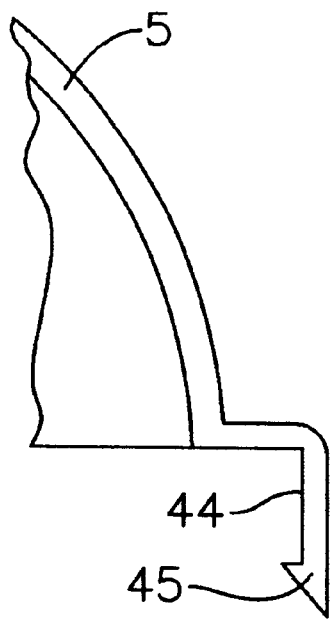
FIG. 24 shows a detail of the lid of FIG. 20.

The lid 5 has, approximately opposite from the lip 1, an insertion bar 44 which may be inserted within the angled receiving opening 36. This bar 44 is approximately perpendicular to the bottom 38 of the dog bowl when the lid 5 is in place and closed. A threaded screw hole 46 is present in the outside wall 42 of the bowl 7 at the location between the top of the receiving opening 36 and the barbed end 45 of the insertion bar 44 at the bottom of the insertion bar 44. A bolt 43 fits into the threaded screw hole 46. The bolt 43, when inserted, will push against the insertion bar 44. As the bar 44 is pushed by the bolt 43, the insertion bar 44 tilts against the angled edge 40 and the lid 5 is tilted open. As the bolt 43 is removed, the opening of the lid is decreased until it is closed. The insertion bar 44 has a barbed end 45 to make it difficult to remove once inserted. The insertion bar 44 is wide enough to keep it from twisting as it is lifted. The width of the receiving opening 36 is approximately the same as the width of the insertion bar 44. The opening is shown in FIG. 22.

Figure 25:
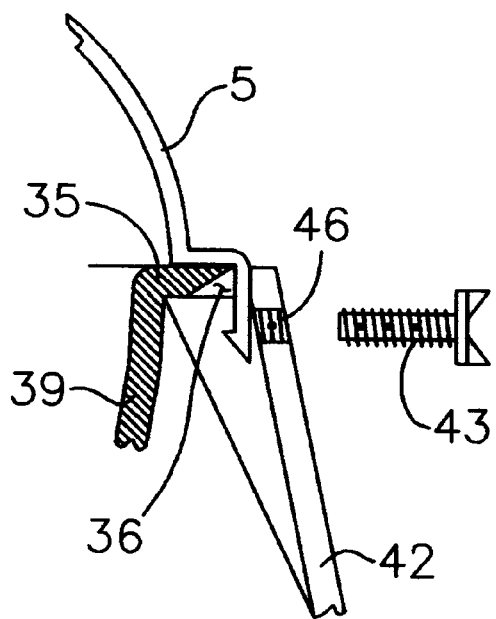
FIG. 25 shows a view of the detail of the lid after insertion for FIG. 20.
Figure 26:
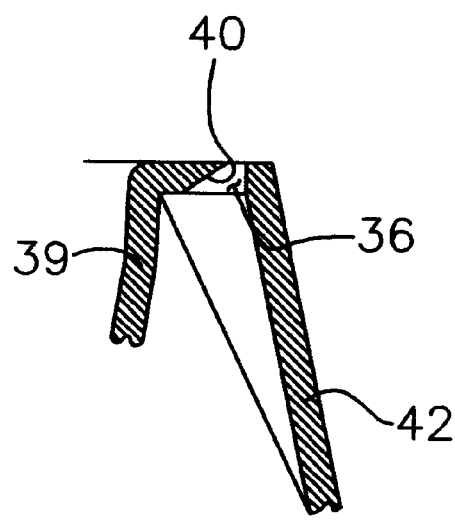
FIG. 26 shows a detail of the point of the bowl where the lid is inserted for FIG. 20.

A maximum open angle of 55 degrees is allowed by the angled edge 40 to prevent the lid from remaining open. In the embodiment shown in FIG. 1, the open angle is controlled by the tail 12 between contacts the lid with the bowl when the lid is open too far. While two methods from preventing the bowl from remaining open are shown, it can easily be seen to those skilled in the art, that different mechanism could be used for returning the lid to it's closed position. For example, a string could run from the bowl to the lid, allowing the lid to rise no more than the desired angle.

Where a bolt 43 is used, as shown in FIG. 25, to train the animal, a daily decrease of 1 turn is used where a standard bolt is shown.

Figure 6:
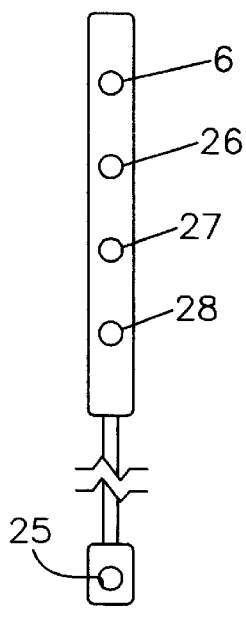
FIG. 6 is the height regulator strap.

In the alternate embodiments shown in FIGS. 1–6 and 7–11, the pet owner trains the animal to raise the lid 5 by placing the height regulator strap 14 shown in FIG. 6 so that the strap opening 25 receives pin 4 which is mounted to the bowl 7. The opposite end of the strap 4 has four holes, first adjusting hole 6, second adjusting hole 26, third adjusting hole 27 and fourth adjusting hole 28 which receive the knob 2 on the lid 5. Since the first adjusting hole 6 is farther from fourth adjusting hole 28, as the hole used varies along the length from 28 to 6 the lid is gradually lowered during the training process.

Figures 12, 13:
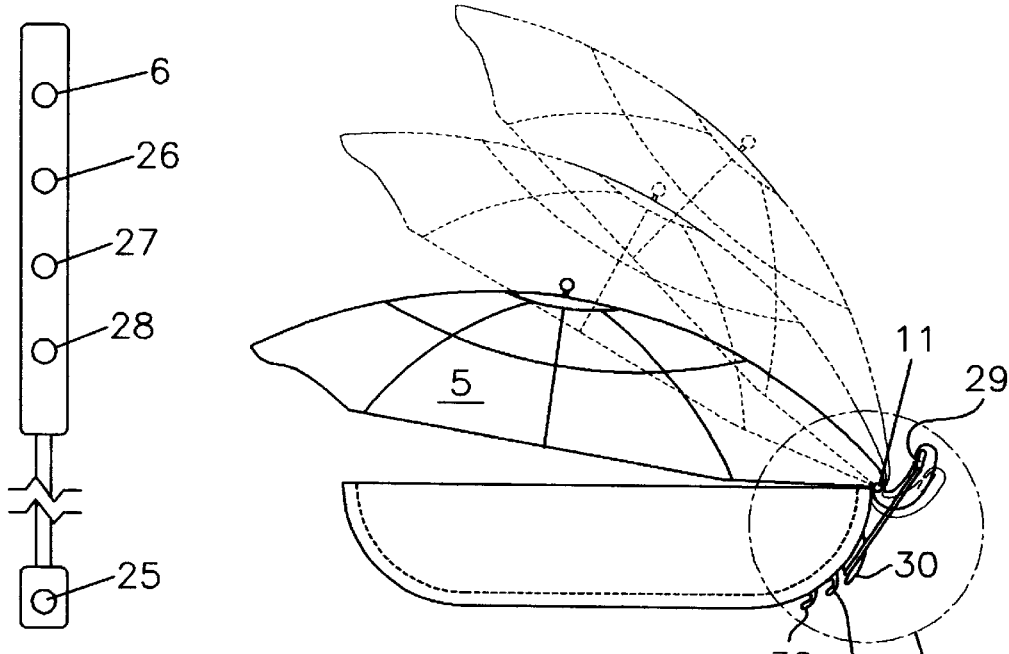
FIG. 12 is an alternate of the embodiment shown in FIG. 6.
FIG. 13 is an alternate of the embodiment showing the same view shown in FIG. 1.
Figure 14:
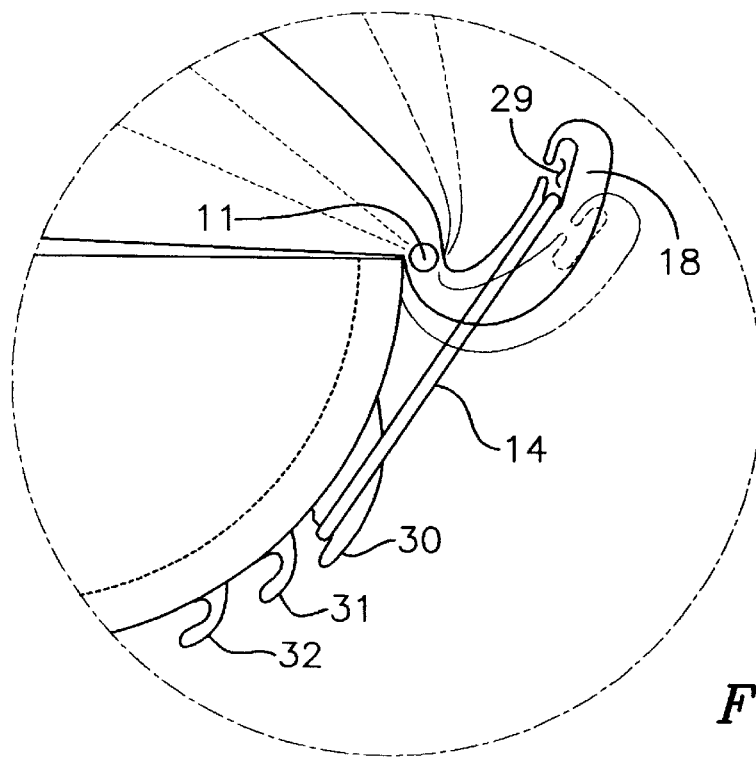
FIG. 14 is detail of the fulcrum shown in FIG. 13.
Figure 15:
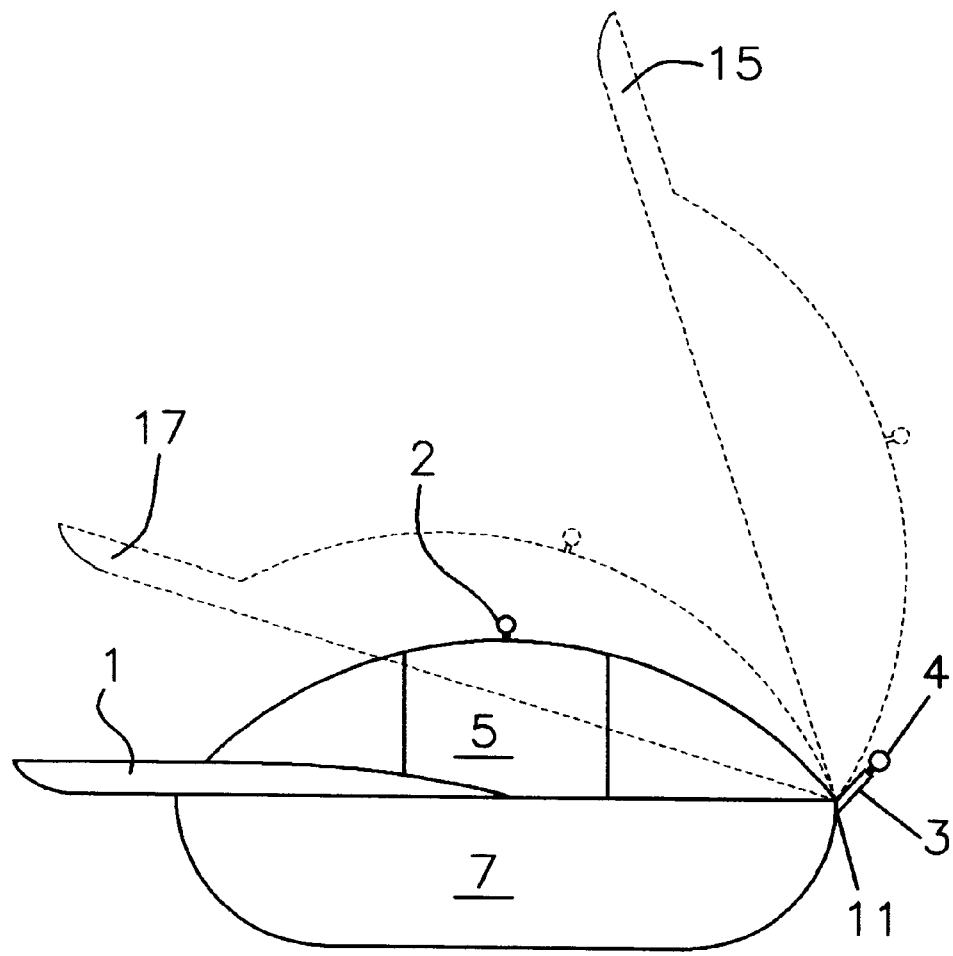
FIG. 15 shows several views in FIG. 1 with measurements.

As shown in FIG. 13 and 14, this arrangement may be varied by using a band 14 of a set length (such as an elastic band or band of string which has one end going into fulcrum gap 29 which is defined by the fulcrum 18 to receive the end of the band. The other end of the band 14 inserts into one of the clips; first clip 30, second clip 31 or third clip 32 which clips 30–32 vary in distance from the fulcrum gap to accomplish the same purpose of gradually lowering the lid. The fulcrum arm 18 allows the user to place his foot against the fulcrum arm 18 and apply pressure to tilt and lift the lid. The fulcrum arm 18 may have a shape and length so that when the fulcrum arm 18 is pressed fully to the ground, the lid 5 is tilted open to the desired height.

Figure 16:
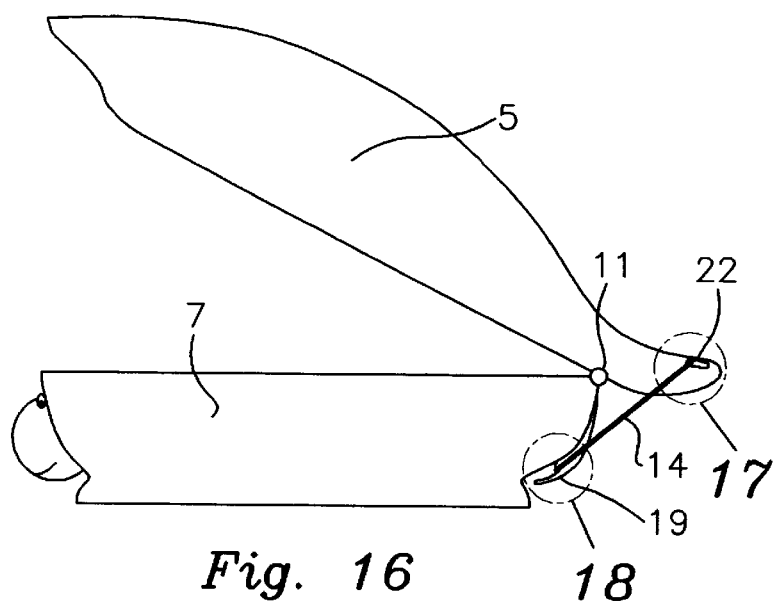
FIG. 16 shows an alternate embodiment.
Figures 17, 18:
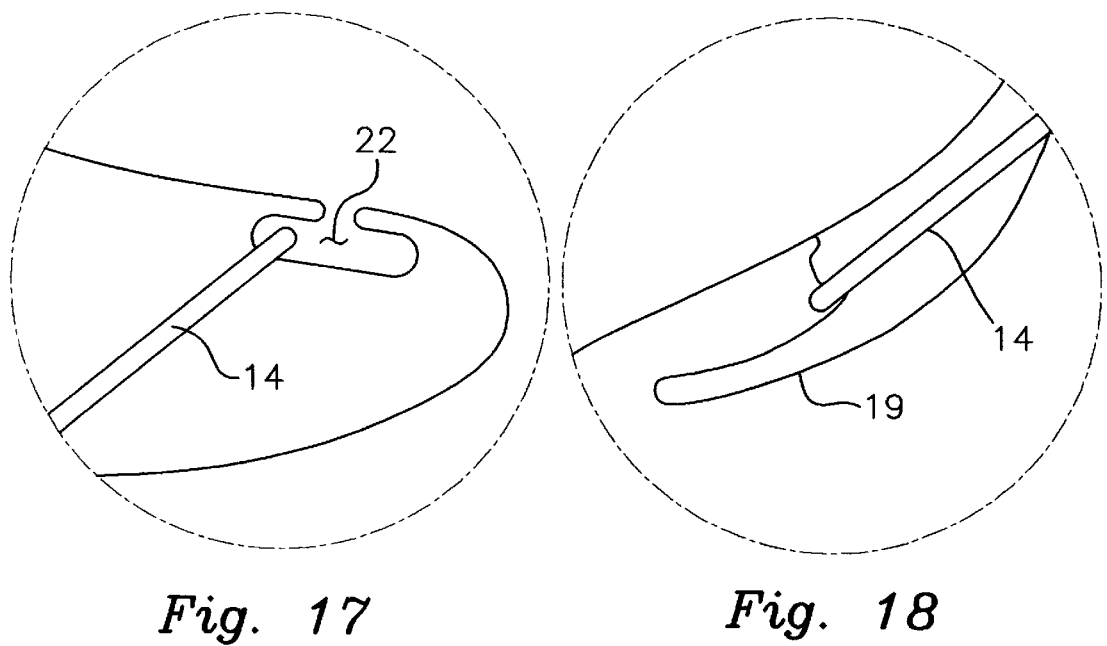
FIG. 17 shows a close up of the fulcrum of FIG. 16.
FIG. 18 shows a close up of the base of FIG. 16.

In the embodiment, shown in FIGS. 13 and 14 the band 14 of set length may go into an attachment point 22 in a fulcrum arm 18 of the lid 5 opposite the lip 1. The other end of the band 14 would then clip onto first clip 30, second clip 31 or third clip 32. The clip used depends on the level, first level 15, second level 16, or third level 17 desired. As shown in FIGS. 16, 17 and 18, a single fulcrum point of attachment 22 may be used with a single base clip 19 by varying the length of the strap 14, instead of varying the point of attachment between several clips.

In this way it can be seen that the invention is comprised of a bowl having a lid 5 with a lip 1 which an animal may lift which may be gradually held open at varying heights from approximately 90 degrees, preferably regulated to be less than 60 degrees, to assure it will reclose, to a closed position. The lifting is preferably against a hinge pivot 11 or fulcrum opposite from the lip 1.

The training process can be described as:
a) presenting the animal with a bowl having the cover raised sufficiently to allow the animal to eat from the bowl wherein said cover has a lip extending past the bowl;
b) gradually lowering the cover so that the animal must lift the cover to fully empty the bowl until the cover is completely lowered over a number of days as required by the learning time of the animal.

During and after training the animal pushes on the lid lip (1) to about 15–30 degrees to get to the food in the bowl 7. If the animal tries to pull the food out onto the floor with paw, the bowl may be provided with a rim (9) which overhangs the interior 10 of the bowl 7 to prevent food from being scraped out.

As can best be seen by reference to FIG. 1, without interfering with a fulcrum which would fit on either side of the tail 12, a raised tail 12 may receive a screw 3 which has an end pressing on the lid 5 to restrict the amount the bowl will open in order to keep larger pets (such as a large dog) from trying to get in the smaller pet's (a normal cat) food. This height regulator screw (3) can be screwed in clockwise to restrict the distance that the lid (5) can open. The height regulator screw could also be replaced with a regulating strap which would extend from the bowl to the lid to prevent the amount it would open. This strap would have a length, based on the needed length to properly adjust for the bowl after the mold is made. If a fulcrum arm 18, as part of the lid 5, is used as shown in FIG. 13, the fulcrum arm 18 would need to not interfere with the raised tail 12. To fill with food, the user may lift using the knob 2 or by pushing on the fulcrum arm 18 shown in FIG. 13 to lift the lid.

Figure 2:
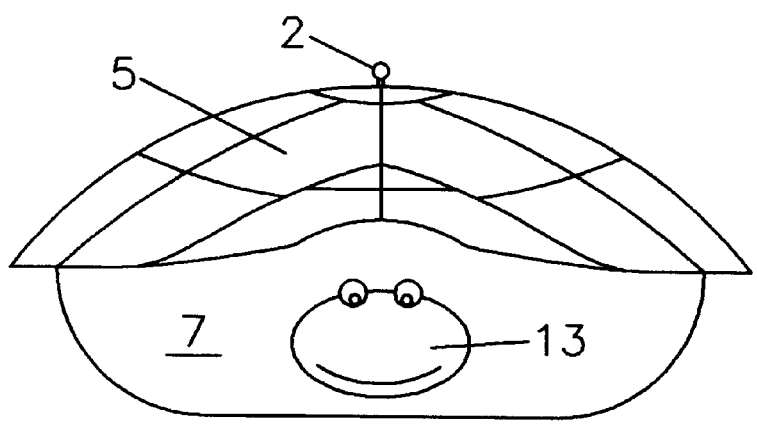
FIG. 2 is the front perspective view of the Flipper Feeder when closed.
Figure 3:
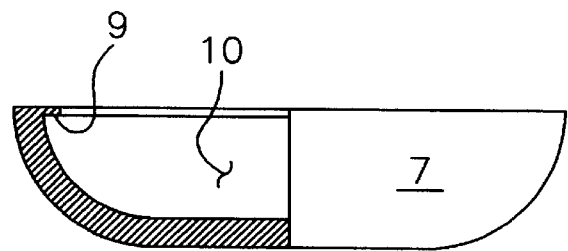
FIG. 3 is the sectional view, without the lid, of the Flipper Feeder.
Figure 4:
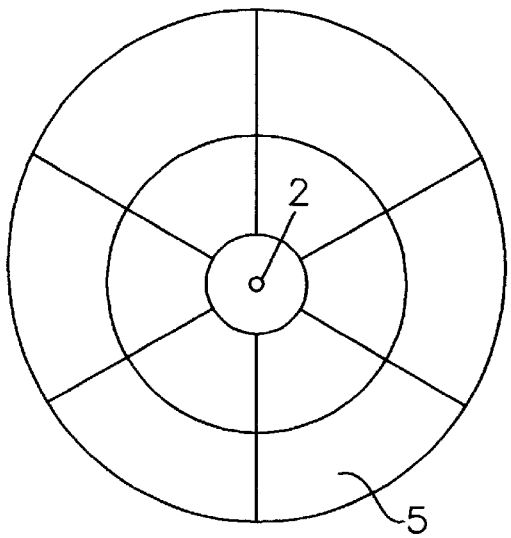
FIG. 4 is the top view of the Flipper Feeder.
Figure 5:
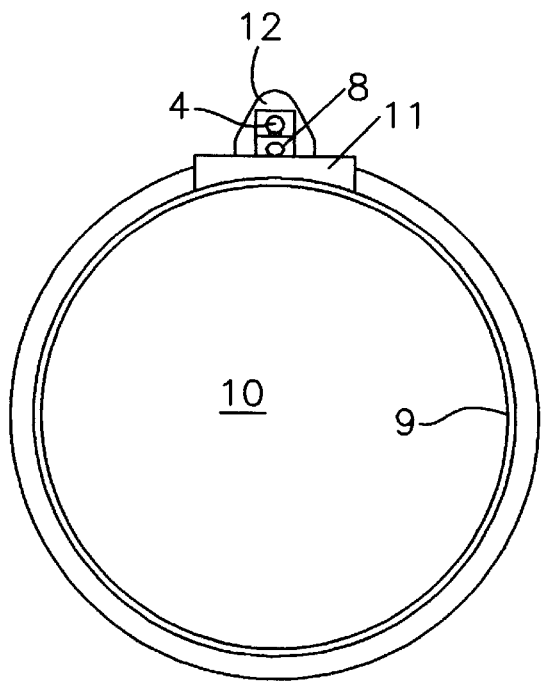
FIG. 5 is the top of the lower section of the Flipper Feeder.

In the embodiments shown in FIGS. 1–11, the lid 5 pivots around pivot 11 to open and shut over the bowl 7. The fulcrum arm 18, used to adjust the height or as a step for lifting the cover by the user to refill the bowl, is on one side of the pivot 11 and the remainder of the lid 5 is on the other side of the pivot. To enhance the appeal of the product, a face 13 may be added as shown in FIG. 2.

The lid 5 may be partially received along its perimeter into the perimeter of the bowl where the two meet, may have cushioning at this intersection or may overlap at this intersection in order to enhance the seal when the lid is closed. This seal is important for several reasons. One it reduces the smell which would attract pests, second it prevents bugs from entering and finally it keeps the food fresher when the lid is closed. If a portion of the lid fits within the perimeter of the bowl top, a second umbrella would preferably extend outside of the perimeter of the bowl top to keep out water.

Figure 7:
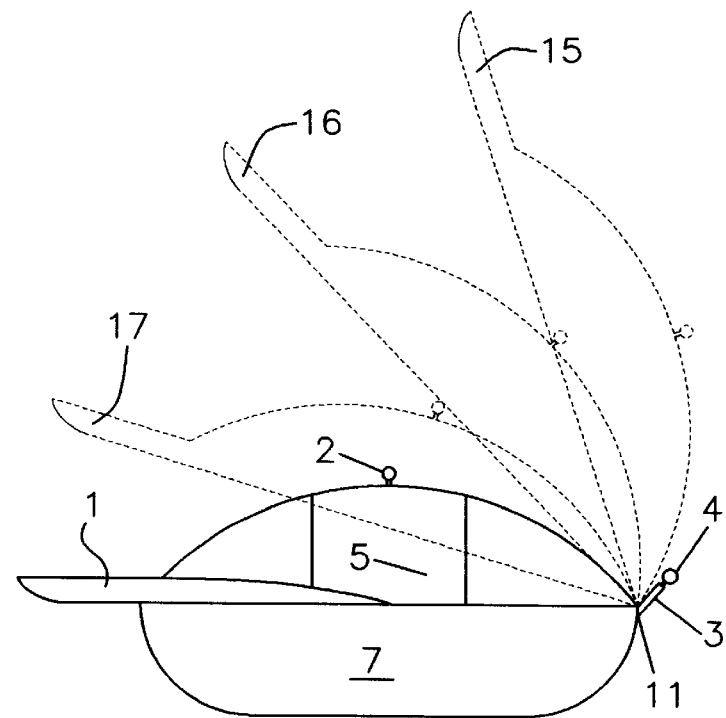
FIG. 7 is an alternate of the embodiment shown in FIG. 1.
Figure 8:
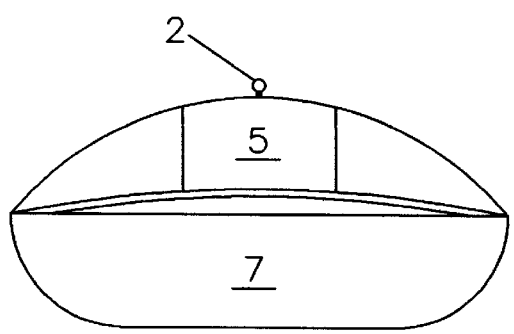
FIG. 8 is an alternate of the embodiment shown in FIG. 2.
Figure 9:
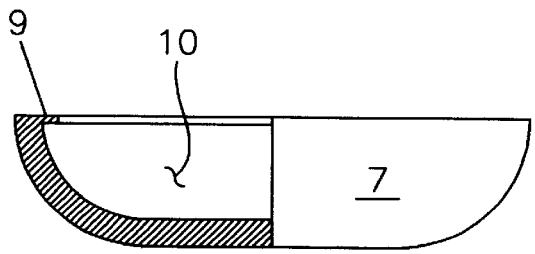
FIG. 9 is an alternate of the embodiment shown in FIG. 3.
Figures 10, 11:
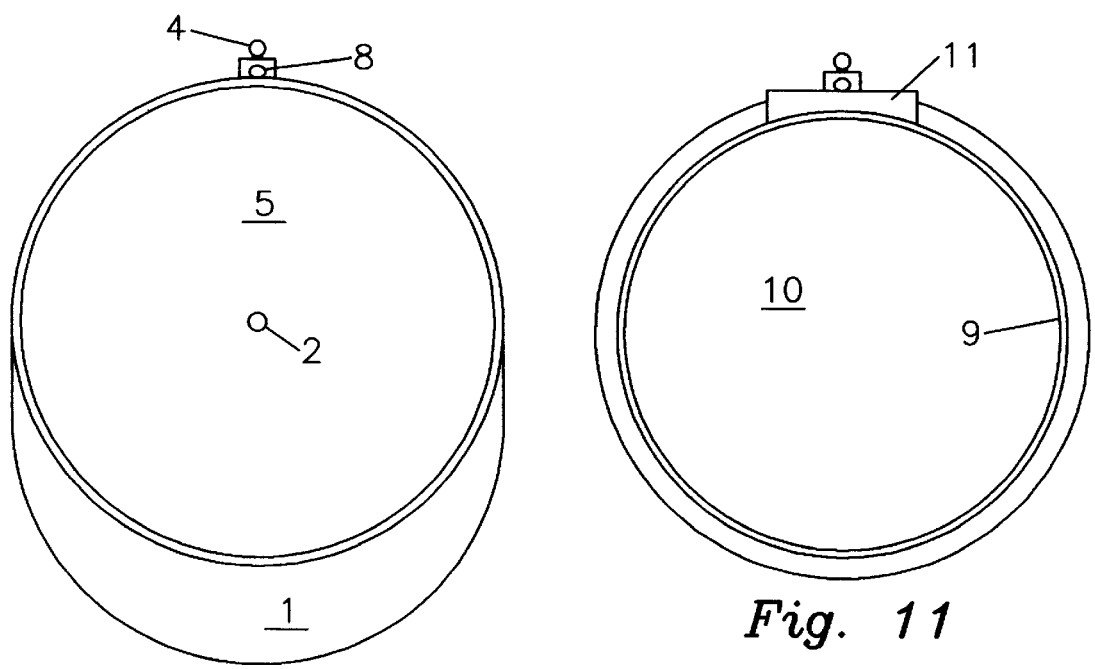
FIG. 10 is an alternate of the embodiment shown in FIG. 4.
FIG. 11 is an alternate of the embodiment shown in FIG. 5.

To facilitate the lifting of the lid 5, a lip 1, best seen in FIG. 7, may be present in order to allow the animal to properly get its snout under the lid for lifting.

Figure 19:
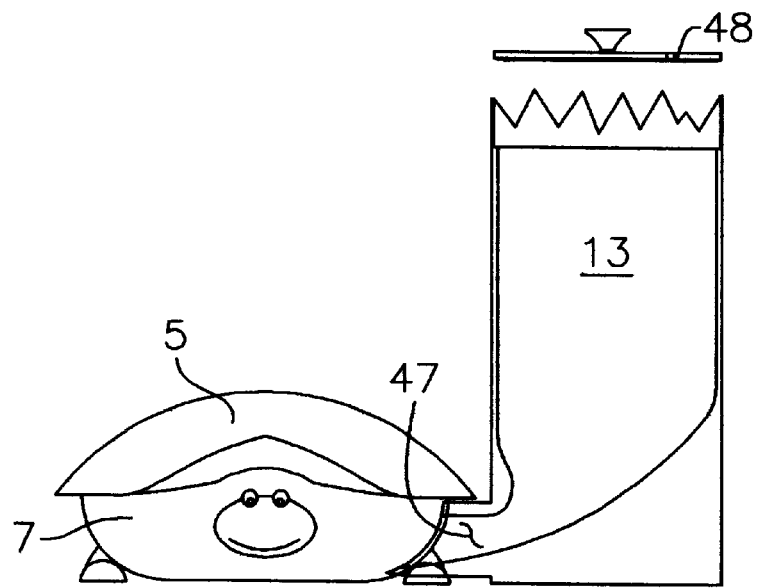
FIG. 19 shows another close up of the base of FIG. 16.
Figure 19A:
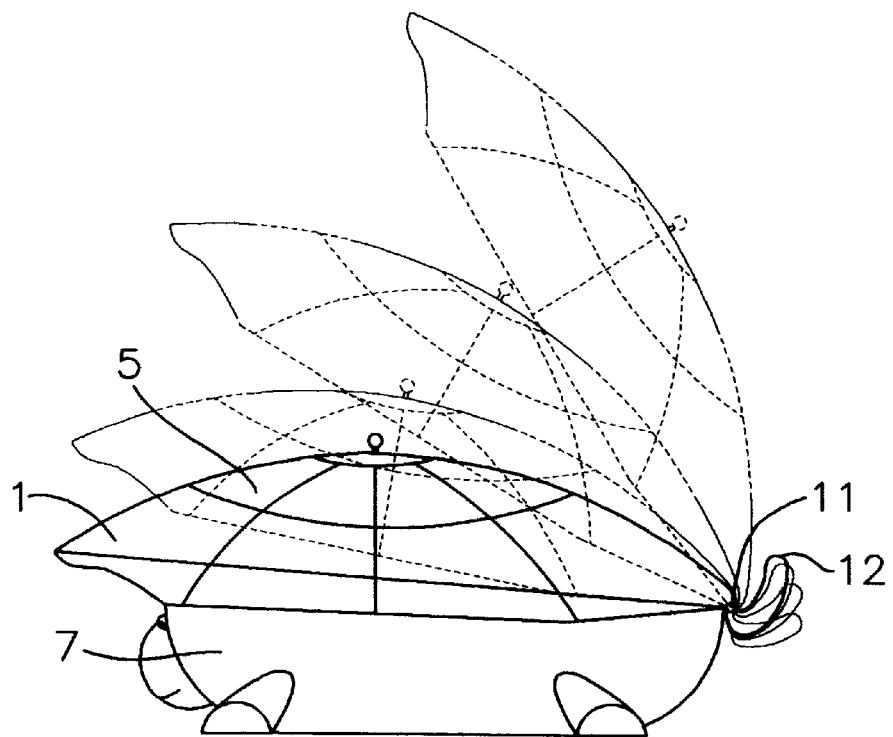
Figure 20:
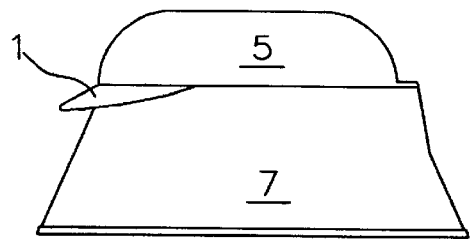
FIG. 20 shows side perspective view of an alternate embodiment.
Figure 21:
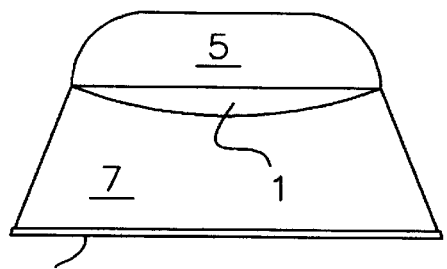
FIG. 21 shows a front perspective view of the embodiment shown in FIG. 20

FIG. 19 shown an alternate embodiment with a side gravity feed which can lead into the interior 10 of the bowl 7 so that larger amounts of food may be introduced immediately into the tray or bowl 7. This gravity feed comprises a reservoir 13 communicating with a reservoir opening 47 in the bowl 7. Some regulating valve means is provided typically to prevent the bowl from over filling. The pressure downward may be regulated by controlling the height of the reservoir, or where fluids are contained in the reservoir, some more elaborate mechanism may be used, such as a valve. This reservoir is shown sealed by a cap 48. If a valve is used to control the reservoir it may be in place at the reservoir opening 47.

As is obvious, this technology may also be used with water bowls as with food bowls so that the water drank by the animal is maintained fresh.

Sizes will be about 6 to 8 inches in diameter for the bowl (7), as determined by test molds, for small animals like cats. For bigger animals the bowl size will be around 10 to 12 inches in diameter.

As can be seen by reference to FIG. 13, for example, the training process involves;

Step 1. Connect strap to bowl 7 at the first clip and to lid at the fulcrum gap 29 in order to keep the lid open to fullest position. Place food/water in bowl and allow pet to eat regularly from the bowl for a period of three days.

Step 2. Connect strap at the second clip 31, allowing lid to open at partial full position. Fill bowl and food/water and allow pet to eat regularly for a period of three days.

Step 3. Connect strap at the last first clip 30, allowing lid to open at the near closed position. Fill bowl with food/water and allow pet to eat regularly for a period of three days.

Step 4. Remove the strap. Refill bowl. Pet should be present to see bowl filled. Allow pet to eat by raising the lid. If the pet refuses to open lid after a reasonable amount of time (half a day should do) repeat steps 1–4.

Because many varying and different embodiments may be made within the scope of the inventive concept herein taught and because many modifications may be made in the embodiment(s) herein detailed in accordance with the descriptive requirements of the law, it is to be understood that the details herein are to be interpreted as illustrative and not in a limiting sense.

What is claimed is:

1. A covered pet bowl having a training apparatus comprising:
   a) a bowl having an interior, an exterior and an interior diameter, said bowl defining a top, a bottom, a front and a back;
   b) a hinge means for holding a lid incorporated into the back of the bowl;
   c) a lid having a front end and a rear end, said rear end mounted to the hinge means, so that the lid may move from a position where the lid is covering the bowl interior to a position where the front end is raised above the bowl top at an angle determined by the hinge means; and
   d) said hinge means further comprising a holding means for holding the lid above the bowl at at least one set opening above the bowl top and so that the lid may releasably open from the at least one set opening to a larger opening by the pet pushing upward on the lid and allowing the lid to return to the at least one set opening after the pet releases the lid and wherein the holding means further comprises an incremental holding means for holding the lid at at least two separate incremental set openings determined by the incremental holding means, wherein an angled wall on the exterior of the bowl and an insertion bar attached to the lid and a screw holding means for releasably holding the insertion bar against the angled wall to angle the lid at a desired height above the bowl perimeter to serve as a holding means.

2. The bowl of claim 1 further comprising;
   e) a lip located at the front end of the lid which may be engaged by the pet for lifting the lid to gain access to the bowl.

3. The bowl of claim 1 wherein the size of the opening between the lid lip and the bowl is not restricted from increasing to a larger opening by the animal pushing upward on the lid.

4. The invention of claim 1 wherein the screw holding means further comprises a wall exterior to the bowl defining a threaded opening aligned with the insertion bar and angled wall, the screw holding means including a bolt fitting within the threaded opening so that the bolt may be inserted to push the insertion bar to a desired extent against the angled wall to angle the lid at a desired hight.

5. The invention of claim 1 wherein the bowl lid farther comprises an opening regulation means for maintaining an arc from the bowl to the lid lip of less than 60 degrees to allow gravity to re-close the lid to the at least one set opening after it is released from the larger opening.

6. The invention of claim 5 wherein the opening regulation means farther comprises a second wall between the lid and the bowl so that the second wall contacts the lid to prevent further opening when the arc reaches a predetermined angle of at least 60 degrees.

* * * * *